US005508675A

United States Patent [19]

Mahagan

[11] Patent Number: 5,508,675

[45] Date of Patent: Apr. 16, 1996

[54] MINIATURE GAS TUBE ASSEMBLY WITH BACK-UP AIR GAP

[75] Inventor: Param Mahagan, Deer Park, N.Y.

[73] Assignee: TII Industries Inc., Copiagur, N.Y.

[21] Appl. No.: 214,625

[22] Filed: Mar. 18, 1994

[51] Int. Cl.[6] .......... H01H 61/00; H01H 39/00; H02H 1/00; H02H 1/04

[52] U.S. Cl. .......... 337/28; 337/32; 337/34; 337/15; 361/117; 361/120

[58] Field of Search .......... 337/15, 24, 28, 337/29, 30, 31, 32, 33, 34; 361/117, 118, 119, 120, 124, 129

[56] References Cited

U.S. PATENT DOCUMENTS

| | | | |
|---|---|---|---|
| 3,975,664 | 8/1976 | Baumbach . | |
| 4,150,414 | 4/1979 | Pagliuca | 361/124 |
| 4,212,047 | 7/1980 | Napiorkowski | 361/124 |
| 4,303,959 | 12/1981 | Roberts | 361/124 |
| 4,326,231 | 4/1982 | Coren | 361/119 |
| 4,380,036 | 4/1983 | Coren | 361/119 |
| 4,405,967 | 9/1983 | Cwirzen | 361/124 |
| 5,027,100 | 6/1991 | Neuwirth | 337/32 |
| 5,029,302 | 7/1991 | Masghati | 337/32 |
| 5,313,183 | 5/1994 | Kasahara | 337/32 |
| 5,388,023 | 2/1995 | Boy | 361/129 |

FOREIGN PATENT DOCUMENTS

| | | | |
|---|---|---|---|
| 2078025 | 12/1981 | United Kingdom | 361/124 |
| 2222023 | 2/1990 | United Kingdom | 361/120 |
| WO94/00864 | 1/1994 | WIPO | 337/28 |

*Primary Examiner*—Leo P. Picard
*Assistant Examiner*—Stephen T. Ryan
*Attorney, Agent, or Firm*—Martin Sachs

[57] ABSTRACT

A miniature overvoltage protection device including a back-up air gap for use in miniature telephone modules and related equipment includes a generally U-shaped bracket adapted to receive an overvoltage protection device thereon and has a bracket insulating member with a dielectric disposed between the overvoltage protection device terminals and the ground provided on a U-shaped bracket in order to provide back-up air gap protection. In addition, it may include a thermally sensitive material to insulate the overvoltage protection device from the grounding bracket which is activated upon excessive heat occurring in the overvoltage protection device.

11 Claims, 2 Drawing Sheets

MINIATURE GAS TUBE ASSEMBLY WITH BACK-UP AIR GAP

BACKGROUND OF THE INVENTION

1. Field of the Invention

The present invention relates generally to overvoltage protection devices used in the telephone communications field and, more particularly, to a miniaturized overvoltage back-up protection assembly generally associated with gas tube protection devices.

2. Discussion of the Relevant Art

Numerous mechanical arrangements have been suggested to provide a fail-safe arrestor for electrical circuits which utilize a gas tube to carry an overvoltage including a shorting or ground clip to provide a secondary path should the gas tube vent. Typical of this type of construction is U.S. Pat. No. 5,029,302, issued to Masghati, et al. on Jul. 2, 1991. However, further attempts were made to reduce the size of the overvoltage protection, particularly where the electrodes of the gas filled overvoltage protection device included three terminals all of which include leads thereon extending perpendicular to the longitudinal axis of the gas filled device or alternatively, included three electrode rings which in some manner makes contact with the circuitry that was to be protected, as disclosed in U.S. Pat. No. 5,027,100, issued to Neuwirth, et al. on Jun. 25, 1991.

The present invention is an improvement over the prior art by providing a miniaturized overvoltage protection device which is affixed on the generally U-shaped mounting bracket and does not require any additional expertise by the technician replacing the overvoltage protection device, since the back-up overvoltage device is part of the mounting bracket and not affixed to the overvoltage protection device itself.

Therefore, it is an object of the present invention to provide a miniature overvoltage protection apparatus with a back-up air gap assembly affixed to the mounting bracket utilized by the overvoltage protection device.

It is another object of the present invention to provide a reliable overvoltage protection apparatus having a back-up air gap assembly as part of the mounting bracket.

It is still yet another object of the present invention to provide a miniature overvoltage protection apparatus combined with a back-up air gap assembly which does not have to be disturbed when the back-up protection assembly is replaced.

It is still yet another object of the present invention to include a back-up air gap assembly on a mounting clip.

SUMMARY OF THE INVENTION

A miniature overvoltage protection apparatus having a back-up air gap assembly including a generally U-shaped bracket with a central portion and a pair of arms extending in an inwardly direction providing an inward pressure. Each one of the arms is adapted to be insulated from electrically conductive contact with the first and second terminals of an overvoltage protection device placed therein. A bracket having a flat portion and preferably three finger portions equally disposed around the circumference is folded upon itself to retain the back-up air gap assembly, which includes a dielectric disposed between the flat portion and the folded over fingers and the arm of the U-shaped bracket and an insulator, which is disposed between the folded over finger portions on the other side of the arm of the U-shaped bracket and is retained in position thereon by the pressure of the folded over finger portions.

BRIEF DESCRIPTION OF THE DRAWING

The subject matter, which I regard as my invention, is particularly pointed out and distinctly claimed in the concluding portion of the specification. In order that the invention may be more fully understood, it will now be described, by way of example, with reference to the accompanying drawing in which:

DESCRIPTION OF THE PREFERRED EMBODIMENT

Figure 1:
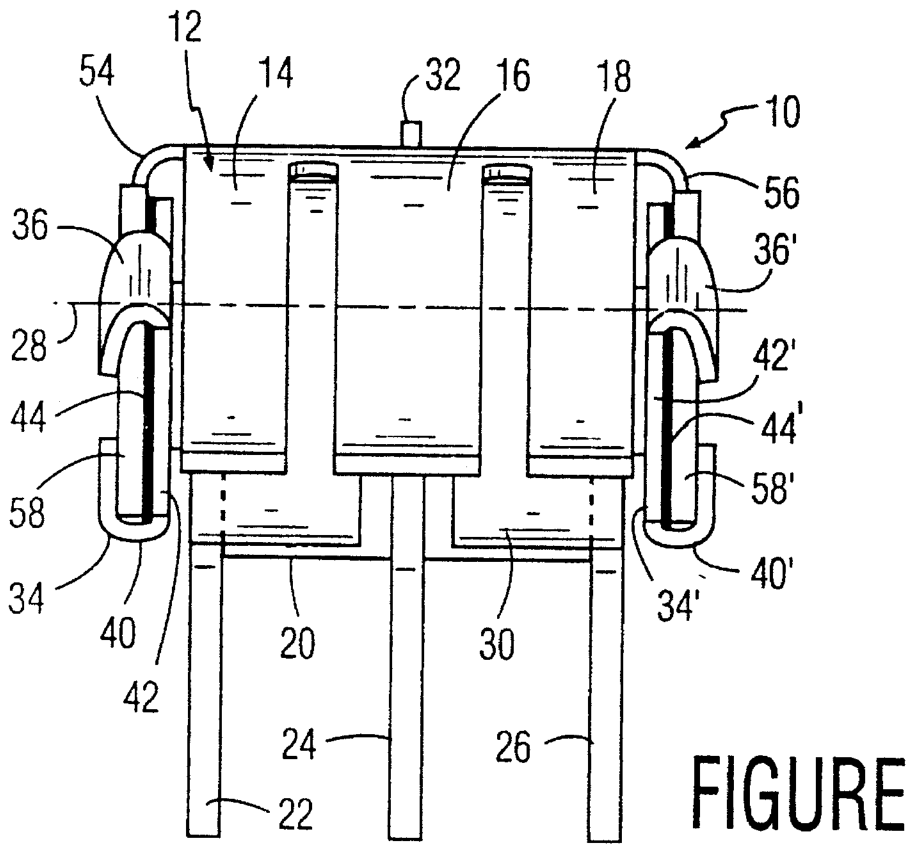
FIG. 1 is a front view in elevation, according to the principles of the present invention, of a back-up air gap assembly.
Figure 2:
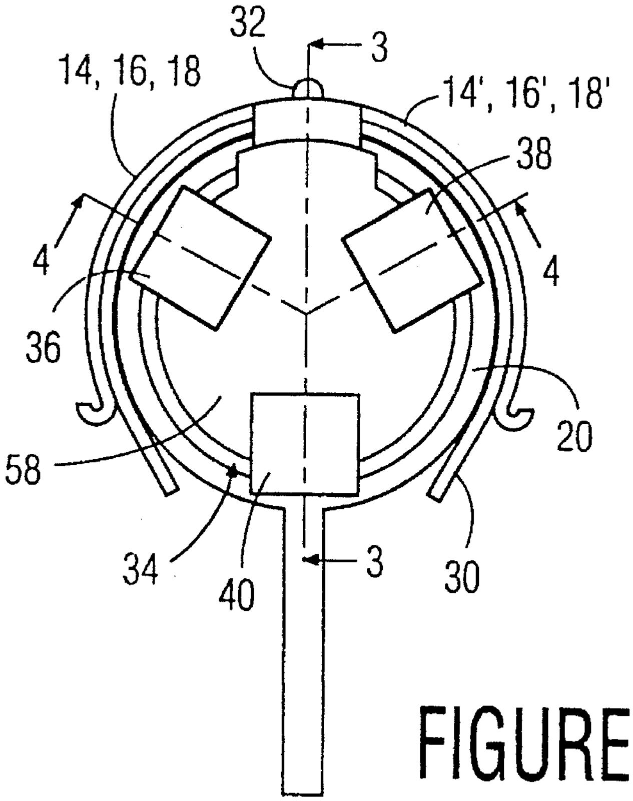
FIG. 2 is an end view in elevation of the embodiment shown in FIG. 1.

Referring now to the figures, and in particular to FIG. 1, there is shown a cross-sectional view of the back-up air gap assembly 10 being affixed on a mounting bracket 12, which comprises a generally U-shaped bracket having three pairs of curved fingers 14, 16 and 18 and 14', 16' and 18' (see FIG. 2) These fingers are adapted to receive and retain therein an overvoltage protection device 20.

The overvoltage protection device 20 is provided with three terminal lead wires 22, 24 and 26, which extend outwardly in a transverse direction from the longitudinal axis 28 of the overvoltage protection device 20. Prior to inserting the protection device 20 into the fingers of the U-shaped mounting bracket 12 a thermally sensitive insulating material 30 is placed between the terminal leads 22 and 26 of the overvoltage protection device 20 so that the terminals are insulated (not in electrically conductive contact) with the mounting bracket 12, which is in electrically conductive contact, via terminal lead 24 and finger 16 of the mounting bracket 12, with the systems ground.

The thermally sensitive insulation material 30 extends across the overvoltage protection device perpendicular to the longitudinal axis 28 so that the fingers, 14, 14', 18 and 18' also do not make electrically conductive contact with the terminal leads 22 and 26, which are the protection or voltage terminals of the overvoltage protection device 20. Fingers 16 and 16' also make contact with the terminal lead 24 and further completes the ground connection of mounting bracket 12, which may be affixed to a metallic ground, not shown, via a connection device 32, to the system ground. Connection device 32 may be an eyelet suitable for a wire connection or a threaded device suitable for connection by means of a typical screw or rivet, not shown, or other suitable means.

The back-up air gap assembly 10 includes a bracket 34, which has a plurality of fingers, preferably three, 36, 38 and 40 and a central flat portion 42. It is to be noted that although reference will be made to one of the back-up air gaps the numerals with the prime numbers refer to an identical air gap assembly, which is provided on the other arm of the mounting bracket 12.

Figure 3:
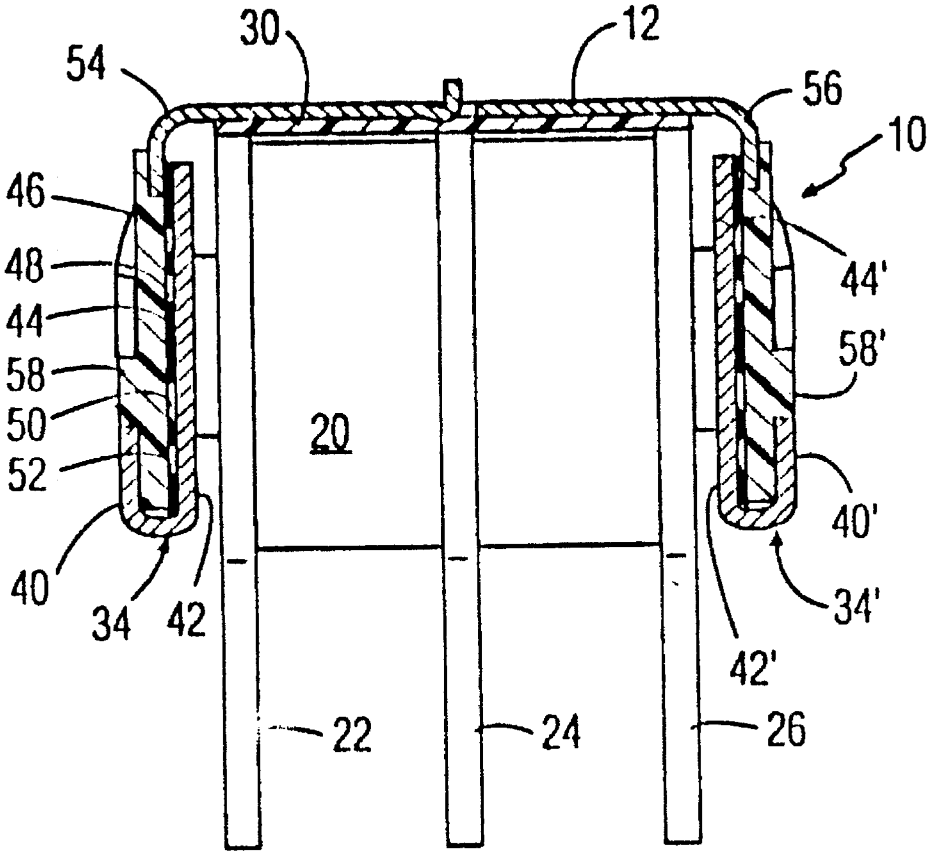
FIG. 3 is a cross-sectional view of the back-up air gap taken essentially along the line 3—3 shown in FIG. 2.
Figure 4:
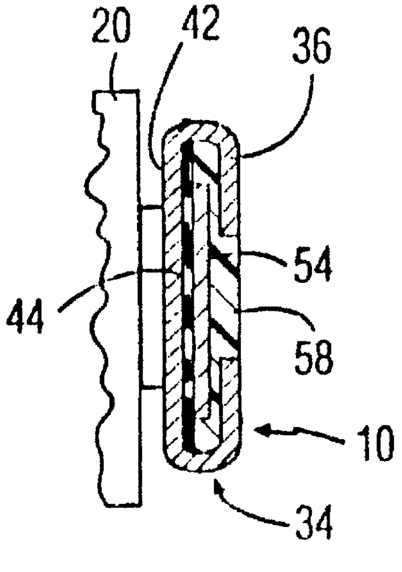
FIG. 4 is a cross-sectional view taken along the line 4—4 of FIG. 2.

Also included in the back-up air gap assembly 10 is a dielectric 44 and 44', which has one surface in direct contact with the flat portion 42 of the bracket 34. Dielectric 44 is provided with a plurality of through apertures 46, 48, 50 and 52 and prevents the arms 54 and 56 from coming into contact with the flat portion 42 or the curved finger portions 36, 38 or 40 of the bracket 34. The back-up air gap assembly 10 is held in position by the folded over fingers 36, 38 and 40 applying pressure to insulator 58, which holds all of the components together and by the aid of friction retains the back-up air gap 10 to the arms 54 and 56 of the mounting bracket 12. The arrangement of the components are more clearly seen with the aid of FIGS. 3 and 4.

Replacing the overvoltage protection device 20 by removing it from the mounting bracket 12 does not disturb the back-up air gap assembly 10 and a new protection device may be readily inserted when required. It is to be noted that terminals 22 and 26 are in electrically conductive contact with brackets 34 and 34' by coming into contact with the flat portion thereof however, terminals 22 and 26 are insulated or not in electrically conductive contact with the mounting bracket 12, since they are removed from the system ground at which the mounting bracket 12 is maintained, by virtue of the dielectric 44 and the insulator 58 which is maintained on arms 54 and 56 of mounting bracket 12 by the folded over fingers 36, 38 and 40.

The thermally sensitive insulation material 30 may be fabricated from one continuous piece with the fingers 16 and 16' piercing the insulation to provide electrically conductive contact with terminal 24 of the overvoltage protection device 20, in a conventional manner.

In operation, an overvoltage protection device 20 is inserted into the generally U-shaped bracket 12, which includes the back-up air gap protection as described herein. If the overvoltage protection device should fail (become vented), an overvoltage transient appearing on either of the terminal leads 22 or 26, which are normally insulated from ground by the insulation material 30, will arc over (break down) the dielectric 44 or 44' and be conducted to ground, via the bracket arms 16 and/or terminal lead 24 of the overvoltage protection device 20, which are connected to the systems ground.

Hereinbefore has been disclosed a back-up air gap assembly for use on a mounting bracket connected to ground for an overvoltage protection apparatus and discloses a means for obtaining thermal overload protection as well as back-up air gap protection. The dielectric may be made of a polyurethane material having a thickness of 3 mils and having at least one hole provided therein. The thermally sensitive insulation material 30 may be of the type generally referred to as a fluorinated ethylene propylene polymer (FEP) generally known as fluoroplastics.

The miniaturized back-up air gap assembly disclosed herein is suitable for use with miniature gas filled overvoltage protection devices, as well as, solid state devices, if it is desired to do so. It will be understood that various changes to the details, materials, arrangements in parts and operating conditions, which have been herein described and illustrated in order to explain the nature of the invention may be made by those skilled in the art within the principles and scope of the present invention.

Having thus set forth the nature of the invention, what is claimed is:

1. A miniature overvoltage protection apparatus with a back-up air gap assembly comprises, in combination:

A. a generally U-shaped bracket having;

a) a central portion, b) a pair of arms, said pair of arms exerting an inwardly directed pressure, each one of said pair of arms being adapted to be insulated from electrically conductive contact with the first and second terminals of an overvoltage protection device, and c) bracket means having a flat portion and at least one finger portion folded upon itself to retain said back-up air gap assembly, said back-up air gap assembly including, i) dielectric means having a first and a second surface and at least one through aperture, said dielectric means first surface being in contact with said flat portion of said bracket means, said dielectric means second surface being in contact with said arm of said U-shaped bracket, and ii) insulation means disposed between said second surface of said dielectric means and said folded finger portion of said bracket means.

2. A miniature overvoltage protection apparatus with a back-up air gap assembly according to claim 1, further including an overvoltage protection device disposed between the arms of said U-shaped bracket, said overvoltage protection device having three terminals, a first and a second protection terminal and a centrally disposed ground terminal, said first and second protection terminals being insulated from said U-shaped bracket and in electrically conductive contact the flat portion of one of said bracket means and the tip or ring terminal of the telephone communication lines, respectively, said ground terminal being connected to ground.

3. A miniature overvoltage protection apparatus with a back-up air gap assembly according to claim 1, wherein said bracket means is provided with three finger portions equally spaced from each other.

4. A miniature overvoltage protection apparatus with a back-up air gap assembly according to claim 1, wherein said insulation means encompasses said arm of said U-shaped bracket preventing said bracket means fingers from coming into electrically conductive contact with said U-shaped bracket arm.

5. A miniature overvoltage protection apparatus with a back-up air gap assembly according to claim 3, wherein said insulation means is provided with a centrally disposed protrusion for centering said insulation means in said bracket means.

6. A miniature overvoltage protection apparatus with a back-up air gap assembly according to claim 2, further including thermally sensitive insulation means disposed between said central portion of said U-shaped bracket and said overvoltage protection device terminals.

7. A miniature overvoltage protection apparatus with a back-up air gap assembly according to claim 2, wherein said U-shaped bracket is provided with three pairs of arms adapted to receive and removably retain said over voltage protection device and further includes thermally sensitive insulation means disposed between said three pairs of arms and said central portion of said U-shaped bracket and said overvoltage protection device terminals.

8. A miniature overvoltage protection apparatus with a back-up air gap assembly according to claim 3, wherein said dielectric means is provided with four through apertures disposed beneath said U-bracket arms.

9. A miniature overvoltage protection apparatus with a back-up air gap assembly according to claim 7, wherein said overvoltage protection device is provided with wire leads affixed to the terminals thereof.

10. A miniature overvoltage protection apparatus with a back-up air gap assembly according to claim 1, wherein the central portion of said U-shaped bracket is provided with means for affixing a electrically conducting wire thereon.

11. A miniature overvoltage protection apparatus with a back-up air gap assembly according to claim 1, wherein the central portion of said U-shaped bracket is provided with means for affixing said bracket to a surface.

* * * * *